United States Patent [19]

Kobayashi et al.

[11] Patent Number: 4,909,014

[45] Date of Patent: Mar. 20, 1990

[54] VACUUM STORAGE DEVICE

[75] Inventors: Hiroshi Kobayashi, Ikoma; Akira Yabunishi, Daito, all of Japan

[73] Assignee: Zojirushi Corporation, Osaka, Japan

[21] Appl. No.: 287,121

[22] Filed: Dec. 21, 1988

[30] Foreign Application Priority Data

Apr. 7, 1988 [JP] Japan .................... 63-47654

[51] Int. Cl.[4] ............ B65B 31/02; B65B 67/00
[52] U.S. Cl. ......................... 53/86; 53/103; 53/510; 53/390
[58] Field of Search ............ 53/432, 86, 88, 97, 53/510, 98, 99, 100, 101, 102, 103, 104, 106, 107, 108, 109, 390

[56] References Cited

U.S. PATENT DOCUMENTS

| | | | |
|---|---|---|---|
| 1,556,981 | 10/1925 | Voight | 53/86 X |
| 1,594,512 | 8/1926 | Von Der Lippe-Lipski | 53/103 X |
| 1,730,419 | 10/1929 | Gillen | 53/103 X |
| 3,026,163 | 3/1962 | Day | 53/432 X |
| 3,252,264 | 5/1966 | Jones et al. | 53/88 X |
| 3,672,114 | 6/1972 | Sacks | 53/88 |
| 3,943,987 | 3/1976 | Rossi | 53/432 X |
| 4,016,999 | 4/1977 | Denzer | 53/88 X |
| 4,033,091 | 7/1977 | Saponara | 53/88 |
| 4,278,114 | 7/1981 | Ruberg | 53/103 X |

Primary Examiner—Horace M. Culver
Attorney, Agent, or Firm—Jones, Tullar & Cooper

[57] ABSTRACT

A vacuum storage device comprises a base member, a housing sealingly and removably mounted on the base member to form a storage chamber, a pressue reducing device mounted on either of the base member and housing, and a means for introducing air into the storage chamber. The pressure reducing device comprises a barrel and a bellows pump housed therein, the bellows pump comprising a bellows body with an inlet valve, which opens the bellows body to said storage chamber during the suction stroke, and an outlet valve, which opens the bellows body to the open air during the dischargeing stroke. The pressure reducing device includes a means for communicating its barrel chamber with the storage chamber.

3 Claims, 5 Drawing Sheets

VACUUM STORAGE DEVICE

FIELD OF THE INVENTION

The present invention relates to a vacuum storage device and, more particularly, to a device for storing food under reduced pressure.

BACKGROUND OF THE INVENTION

It is well known that foods located in vacuum or under reduced pressure can be preserved for a long time as the foods are prevented from chemical oxidation and decomposition during storage. The application of vacuum storage can be found in canned foods, retorted foods and the like. It is, however, difficult to carry out canning or retorting of foods with easy in the family since such a processing operation requires large-scaled plants.

To this end, there has been proposed a device for packing foods, which is operated by the steps of packing foods into a flexible bag such as polyethylene bag, degassing the bag and then sealing the same. Although such a device makes it possible to produce packed foods with ease, it is difficult to reduce the pressure in the bag since a degassing means merely draws the air from the bag. For this reason, it is required to use deformable bags made up of a flexible material such as polyethylene films. In addition, such a package occasionally makes it difficult to safely preserve the foods for a long time, since a large amount of air remains in the bag if the packed foods are of a complex configuration. Also, it is difficult to apply such a device to pack foods containing liquid.

To solve these problems, the present inventors have made a vacuum storage device on a trial basis, as shown in FIG. 7. The vacuum storage device comprises a base member 101, a semispherical housing 102 removably mounted on the base member 101 to form a storage chamber 103, and a pressure reducing device 104. The pressure reducing device 104 has a cylinder 105 and a piston 106 with a suction valve 107, which opens the cylinder 105 to the storage chamber 103 during the suction stroke, and a discharge valve 108, which opens the cylinder 105 to the open air during the discharging stroke. When preserving food in the device, the storage chamber 103 is reduced in pressure by manually operating the pump 104.

However, it has been found that such a vacuum storage device involves some problems to be solved. The greatest problem is operation of the pressure reducing device. If a cylinder chamber 109 between an upper cylinder wall 110 and piston 106 is communicated with the open air, the atmospheric pressure is applied to the whole upper surface of the piston 106 so that the suction stroke caused by a return spring 111 gets late in correspondence to decrease in the internal pressure of the storage chamber 103. If the chamber 109 is hermetically sealed from the atmosphere, it is required to apply a considerably increased force to the piston to cause the discharging stroke since the increase in capacity of the chamber 109 results in reduction in the internal pressure of the chamber 109.

SUMMARY OF THE INVENTION

It is therefore an object of the present invention to provide a vacuum storage device for preserving foods in vacuum or reduced pressures for a long period without causing chemical oxidation and decomposition.

Another object of the present invention is to provide a vacuum storage device that is simple in construction and easy to operate.

Still another object of the present invention is to provide a vacuum storage device useful for preservation of domestic foods.

These an other objects are solved by providing a vacuum storage device comprising a base member, a housing sealingly and removably mounted on said base member to form a storage chamber, a pressure reducing device mounted on either of said base member and housing, and a means for introducing air into said storage chamber, said pressure reducing device comprising a barrel and a bellows pump housed therein, said bellows pump comprising a bellows body with an inlet valve, which opens the bellows body to said storage chamber during the suction stroke, and an outlet valve, which opens the bellows body to the open air during the discharging stroke, said pressure reducing device including a means for communicating its barrel chamber with the storage chamber.

In one preferred embodiment, the pressure reducing device is mounted on the housing and the interior of the barrel is communicated with the storage chamber through gaps formed between the bellows pump and barrel.

In another preferred embodiment, the pressure reducing device is mounted on the base member and its suction port is connected to the storage chamber through a passage provided in the base member.

The vacuum storage device of the present invention is easy to operate and makes it possible to preserve foods under reduced pressures of about 30 Torr for a long time without causing chemical oxidation and decomposition of the foods.

The invention will be further explained in detail with reference to the accompanying drawings which show, by way of example only, preferred embodiments thereof.

BRIEF DESCRIPTION OF THE INVENTION

DESCRIPTION OF THE REFERRED EMBODIMENTS

Figure 1:
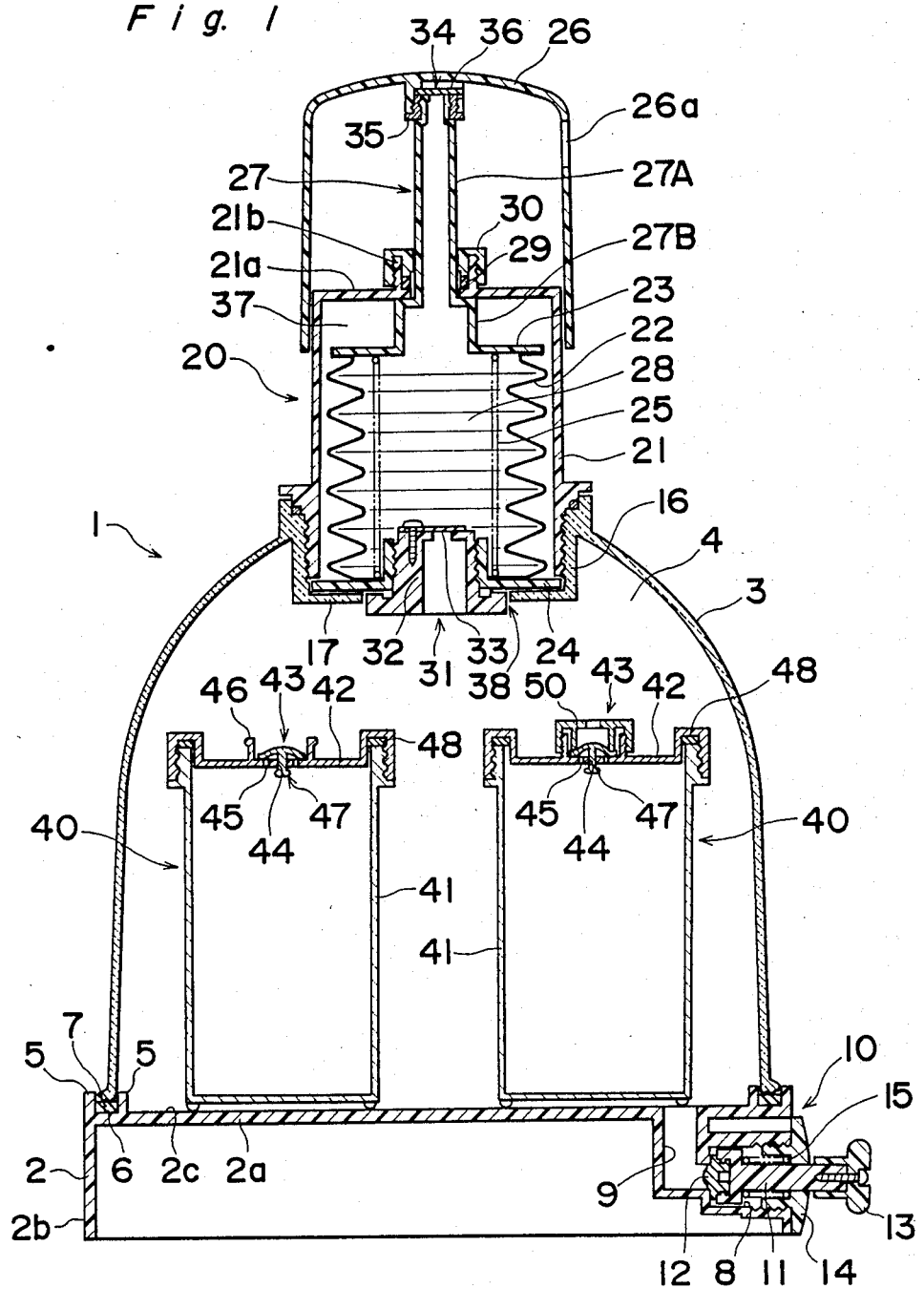
FIG. 1 is a sectional side view of a vacuum storage device according to the present invention.

Referring now to FIG. 1, there is shown a vacuum storage device 1 according to the present invention, comprising a cylindrical base member 2 with a closed top, a semispherical housing 3 removably mounted on the base member 2 to form a closed storage chamber 4, and a pressure reducing device 20 mounted on the housing 3.

The base member 2 has inner and outer annular ribs 5 extending upwardly from its top wall 2a to form an annular groove 6 coaxially with the center axis of the top wall 2a, and an annular packing 7 is arranged in the groove 6 to form a seal between the base member 2 and housing 3. The base member 2 is provided at its side wall 2b with a valve 10 to introduce air into the storage chamber 4 when the device 1 is opened to take out the food preserved therein under the reduced pressure The valve 10 comprises a valve casing 8 and a slide shaft 11. The valve casing 8 is integrally molded with the base member 2 and communicated with the storage chamber 4 through a passage 9. The slide shaft 11 is provided at its one end with a packing 12 and at the opposite end a pulling knob 13. The slide shaft 11 is slidably mounted in a cap member 14 and forced to one end of the passage 9, which serves as a valve seat, by a spring 15 so that the passage 9 is always kept in the closed condition. The cap member 14 is screwed in the casing 8 to hold the slide shaft 11 and spring 15 in their position.

The housing 3 is molded with a suitable transparent material such as glass, synthetic resins and the like and has an open topped cylindrical recess 16 formed as an integral part thereof at the central portion of the top wall. The cylindrical recess 16 has a centrally bored bottom 17 and is provided with an internal thread for attachment of the pressure reducing device 20.

The pressure reducing device 20 comprises a bottom-opened cylindrical barrel 21 and a bellows pump housed therein. The barrel 21 has a bored top wall 21a and is sealingly screwed in the recess 16. The bellows pump comprises a bellows body 22 with an upper plate 23 and a bottom plate 24, and a coil spring 25 arranged between the upper plate 23 and bottom plate 24. The upper plate 23 is provided with an stepped pipe 27, through which the air in a variable space 28 of the bellows body 22 is discharged during discharging stroke. A small-sized portion 27A of the pipe 2 extends upwardly through the bored top wall 21a of the barrel 21 and is hermetically and slidably mounted in the top plate 21a of the barrel 21 by a sealing means including a packing 29 and a fixing ring 30. The fixing ring 30 is screwed on an upwardly extending annular rib 21b of the body member 21. A large-sized portion 27B of the pipe 27 is brought to a stop at the top wall of the barrel 21. At the top of the pipe 27 there is provided a cylindrical operating member 26 to drive the pressure reducing device 20. The operating member 26 has a hole 26a through which the air discharged from the variable volume space 28 of the bellows pump is discharged into the atmosphere.

The bellows pump includes an inlet valve 31 arranged at the central portion of the bottom member 24, and an outlet valve 34 arranged at the top of the pipe 27. The inlet valve 31 comprises a valve seat member 32 screwed in the bottom plate 24 and a flap 33 mounted on the seat member 32. The discharge valve 34 also comprises a valve seat member 35 and a flap 36 mounted thereon to close the opening of the valve 34. The inlet valve 31 opens the bellows body 22 to the storage chamber 4 during the suction stroke, while the outlet valve 34 opens to the atmosphere during the discharge stroke.

In accordance with the present invention, the pressure reducing device 20 has a means for communicating its barrel chamber 37 with the storage chamber 4 to minimize the resistance due to expansion and compression of the air in the barrel chamber 37. This communicating means is constructed by passages or gaps 38 formed between the cylindrical recess 16 and bottom member 24 and between the barrel 21 and bottom member 24. The communicating means may be formed by providing one or more holes penetrating through the recess 16 and barrel 21, or by providing one or more radially extending grooves in the bottom member 24.

The thus constructed vacuum storage device 1 may be operated by a process comprising the steps of placing food in the storage chamber 4; closing the storage chamber with the housing 3; and evacuating the storage chamber 4. The evacuating operation is carried out in the following manner: The operating member 26 is first pushed down by hand to discharge the air in the bellows body 22, and then releasing the hand therefrom to suck in the air from the storage chamber 4. When pushing down the operating member 26, the bellows body 22 is compressed, causing increase in the internal pressure of the bellows body 22. Thus, the outlet valve 34 is opened and the air in the bellows body 22 is discharged into the atmosphere through the pipe 27 and hole 26a during the discharge stroke. At the same time, a part of the air in the storage chamber 4 flows into the barrel chamber 37 surrounding the bellows body 22 through the gaps 38 between the bottom plate 24 and recess 16, so that the internal pressure of the barrel chamber 37 is kept to a pressure equal to the internal pressure of the storage chamber 4. Thus, the resistance due to expansion of air in the barrel chamber 37 is minimized so that the operating member 26 can be pushed down with ease.

On the other hand, when releasing the hand from the operating member 26, the outlet valve 34 is closed and the bellows body 22 is expanded by the spring 25, causing decrease in the internal pressure of the bellows body 22. Thus, the inlet valve 31 is opened and the air in the storage chamber 4 is sucked in the bellows body 22 through the inlet valve 31. At the same time, the air in the barrel chamber 37 of the pressure reducing device 20 is discharged to the storage chamber 4 through the gaps 38, so that the internal pressure of the barrel chamber 37 is kept to a pressure equal to that of the storage chamber 4. In addition, since the pipe 27 is hermetically supported in the barrel, the atmospheric pressure is applied only to a part of the upper plate 23 that corresponds to the cross sectional area of the small-sized pipe 27. Accordingly, the bellows body is returned to the expanded condition smoothly.

When the bellows body 22 is returned to the expanded condition, the inlet valve 31 is closed as the internal pressure of the bellows pump 22 becomes equal to that of the storage chamber 4. After this, the operating member 26 is pushed down again to start next cycle. The above operations are repeated until the pressure in the storage chamber 4 is reduced to about 30 Torr. The internal pressure of the storage chamber 4 may be sensed roughly by pushing down the operating member 26 since an amount of the air discharged from the device 20 through the hole 26a decreases with lowering of the internal pressure of the storage chamber 4.

The food placed in the storage chamber 4 is preserved in vacuum or under reduced pressures, thus making it possible to prevent it from chemical oxidation and decomposition for a long time. In fact, rice cakes preserved in the above vacuum storage device at 30 Torr were kept from getting moldy even after 2 weeks, while bared rice cakes get musty.

When taking out the food preserved in the storage chamber 4, the inlet valve 10 is opened by pulling the knob to introduce the open air into the storage chamber 4 until the internal pressure of the device 1 becomes equal to the atmospheric pressure. Then, the housing 3 is removed from the base member 2.

In the embodiment of FIG. 1, there are shown two kinds of vacuum storage vessels or containers 40 comprising a open-topped cylindrical body 41 and a lid 42. The lid 42 is provided at its central area with holes 44 and 45, which are closed by a valve 43 mounted on the lid 42. The valve 43 includes a valve body 46 formed as an integral part of the lid, and a valve member 47 of an elastic material such as synthetic rubbers. The valve member 47 is inserted at its stem 47a into the central hole 44 of the lid 42 so that its flat portion 47b closes the holes 44 and 45 when the pressure in the body 41 is reduced. Arranged between the body 41 and lid 42 is a packing 48.

Figure 2:
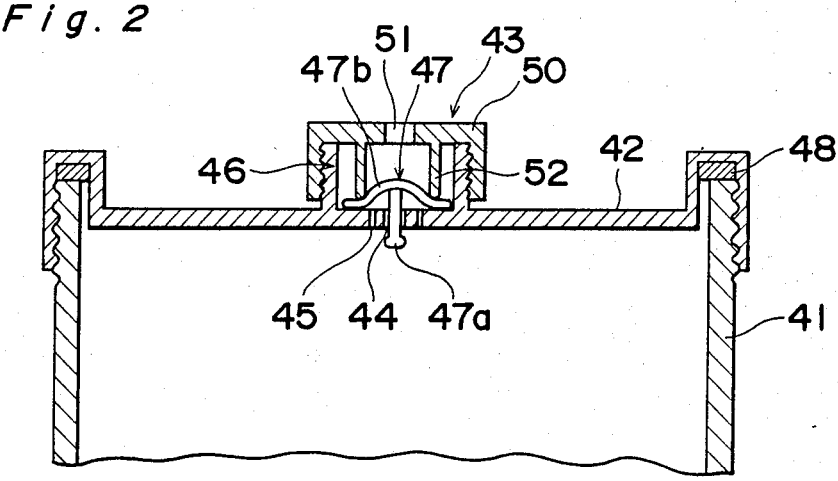
FIG. 2 is a partially enlarged sectional view of a vacuum storage container for use in combination with the vacuum storage device of FIG. 1.

The lid 42 of the container 40 illustrated in the right hand of FIG. 1 has a cap 50 screwed on the annular rib 46. As best shown in FIG. 2, the cap 50 is provided at its central portion with a through hole 51 and an annular rib 52. The annular rib 52 extends downwardly from the top wall of the cap 50 and presses a periphery of the flap portion 47b of the valve body 47 against the lid 42 when the cap 50 is tightly screwed on the rib 46.

The above vacuum storage container 40 may be used in combination with the vacuum storage device 1 in the following manner: Firstly, food is placed in the container 40 and then the lid 42 is screwed on the body 41. The filled container 40 is then placed in the vacuum storage device 1 shown in FIG. 1. When employing the container 40 illustrated in the right hand, the cap 50 should be loosened or removed from the container 41 before placing it in the storage chamber 4 of the device 1 to allow the air to flow through the valve 43. By operating the pressure reducing device 20, the pressure in the chamber 4 is reduced step by step and the air in the container 40 is sucked in the storage chamber 4 through the air holes 45.

After being evacuated sufficiently, the storage chamber 4 is supplied with air through the valve 10 by pulling the knob 13 outwardly. Since the internal pressure of the chamber 4 increases rapidly, the check valve 47 is pressed on the lid 42 by the increased pressure in the chamber 4. Thus, the central hole 44 and air holes 45 of the lid 42 are closed and the interior of the container 40 is kept in vacuum. After the pressure in the chamber 4 has reached to the atmospheric pressure, the knob 13 is released and the housing 3 is lifted to remove the containers 40 from the device 1. The cap 50 may be screwed tightly on the lid 42 to hermetically seal the container 40.

The thus prepared vacuum storage container 40 may be placed in a refrigerator. In this case, the food in the container 40 can be stored for a long time without causing chemical oxidation and decomposition. The food may be taken out from the container 40 by separating the flap portion 47b of the valve 47 from the lid 42 to introducing air into the container 40 and then removing the lid 42 from the container 41.

Figure 3A:
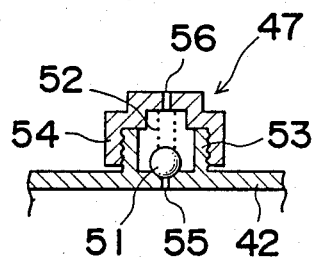
FIGS. 3a and 3b are sectional views showing modified forms of a vacuum storage containers.
Figure 3B:
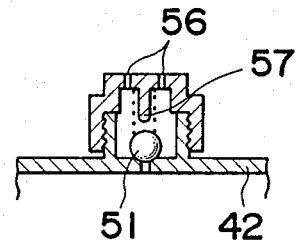

The check valve 47 used for the vacuum storage container in FIG. 1 may be replaced with the one having a construction as shown in FIGS. 3a or 3b.

In FIG. 3a, the check valve 47 comprises a spherical valve body 51 and a spring 52, both of which are housed in a space formed between an annular rib 53 and a cap 54 screwed on the rib 53. The annular rib 53 is formed as an integral part of the lid 42 coaxially with a center axis of a port 55 formed in the central portion of the lid 42. The cap 54 has a port 56 at its central portion. The valve body 51 is force toward an opening of the port 56, which serves as a valve seat, by the spring 52 arranged between the valve body 51 and the cap 54.

The check valve shown in FIG. 3b has a construction similar to that of FIG. 3a except for that the cap 54 is provided at its central portion with a downwardly extending guide rod 57 and two or more ports 55 around the rod 57.

Figure 4A:
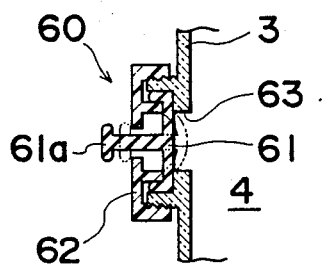
FIGS. 4a and 4b are sectional views showing two forms of a means for indicating internal pressure of the vacuum storage device.
Figure 4B:
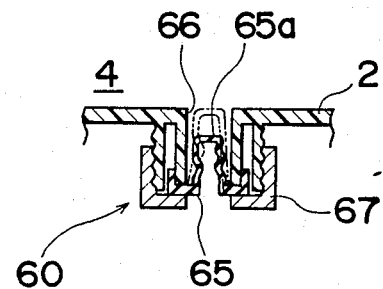

The vacuum storage device 1 of the present invention may be provided with a means for indicating internal pressures of the storage chamber 4, for example, as shown in FIGS. 4a and 4b.

FIG. 4a shows one preferred embodiment of a means for indicating internal pressure of the storage chamber 4. This pressure indicating means 60 includes a pressure indicating member 61 of a highly rigid elastic material, which has a T-shaped cross section and is hermetically mounted on the housing 3 by a fixing ring 62 so as to cover a through hole 63 provided in the housing 3.

To use, with increase in the reduction of the internal pressure of storage chamber 4 the indicating member 61 is drawn into the housing 3, so that a indicating button 61a formed as an integral part of the indicating member 61 sinks into the through hole 63, as illustrated by broken lines in FIG. 4a. The lower the internal pressure of the storage chamber 4, the smaller is a portion protruded beyond the through hole 63 of the button 61a. Thus, the degree of reduced pressure is observed by the protruded portion of the button 61a. It is preferred that the indicating member 61 is so designed that the button 61a is in contact with the surface of the fixing ring 62 when the internal pressure of the storage chamber 4 is reduced to the predetermined pressure. This pressure indicating means may be mounted in the base member 2.

FIG. 4b shows another form of a pressure indicating means 60 attached to the base member 2. The pressure indicating means 60 comprises a bellows-like indicating member 75 of a flexible material such as synthetic rubber and arranged in a through hole 66 provided in the base member 2 by a fixing ring 67.

In use, the indicating member 65 is drawn into the storage chamber 4 step by step in corresponding to the lowering of the internal pressure of the storage chamber 4, thus making it possible to indicate the degree of reduction of the internal pressure of the storage chamber 4. Preferably the indicating member 65 is so designed that its upper surface 65a is on the same plane as the surface of the base member 2 when the internal pressure of the storage chamber 4 is reduced to the predetermined pressure.

Figure 5:
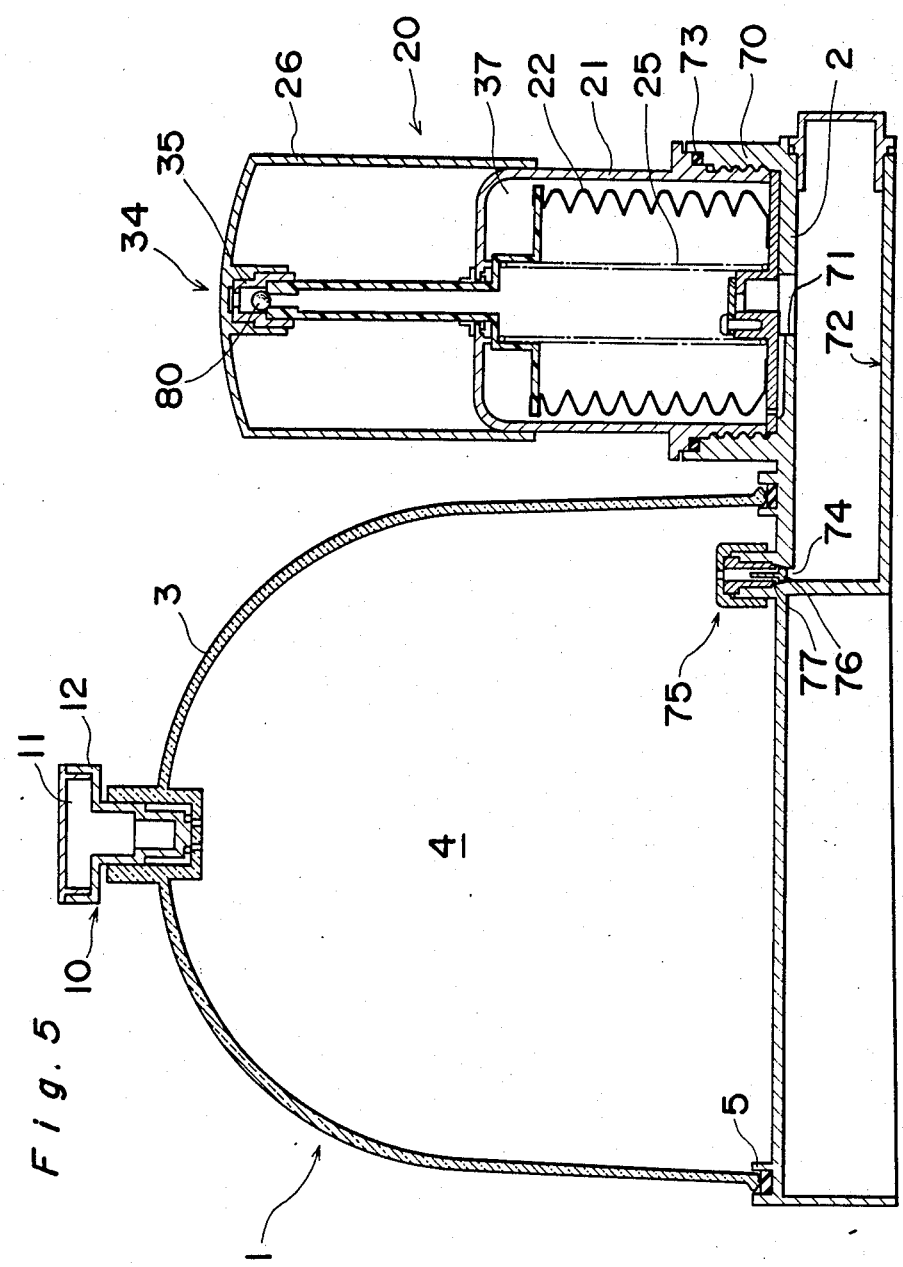
FIG. 5 is a sectional view of a vacuum storage device, showing another embodiment of the present invention.
Figure 6:
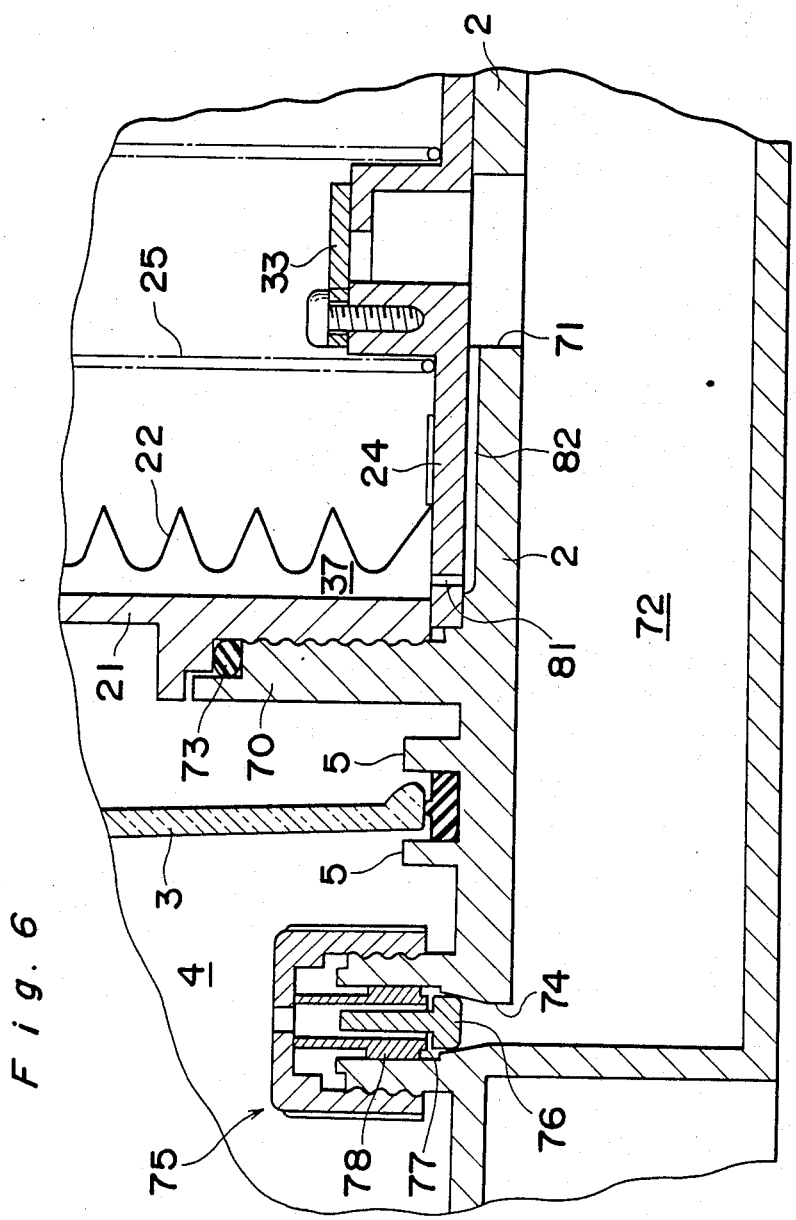
FIG. 6 is a partial enlarged view of the vacuum storage device of FIG. 5.
Figure 7:
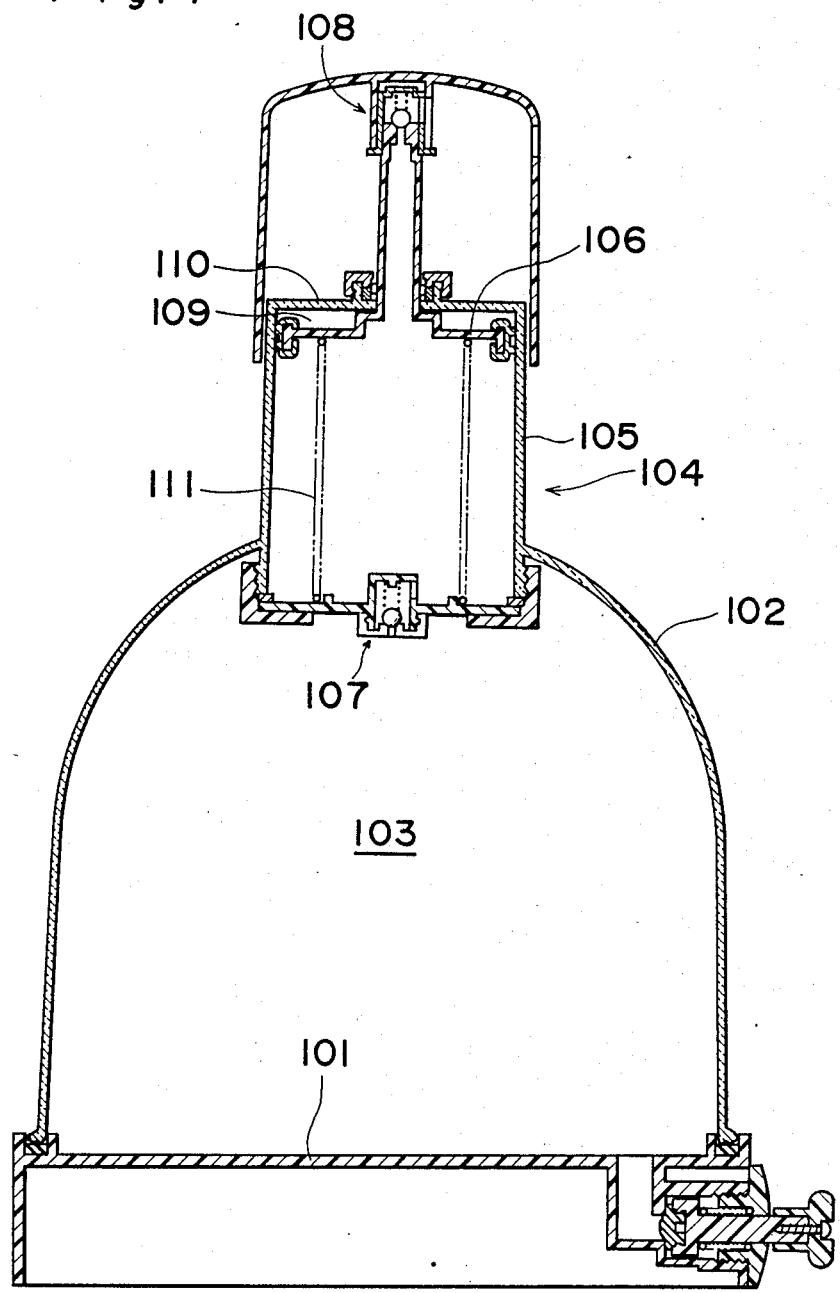
FIG. 7 is a sectional view of a vacuum storage device on a trial basis.

Referring now to FIGS. 5 and 6, there is shown another preferred embodiment of the present invention. In this figure, similar parts corresponding to those in FIG. 1 have been indicated by the same reference numbers. The vacuum storage device comprises a base member 2 and a housing 3 arranged thereon. To provide a mounting seat for a pressure reducing member 20, the base member 2 is provided with an upwardly extending annular projection 70 and a bore 71 communicated with the storage chamber 4 through a passage 72. The passage 72 is connected to the storage chamber 4 by an inlet port 74 provided in the base member 2.

At the end of the inlet port, there is provided a check valve 75 including a movable valve disk 76, which opens the storage chamber 4 to the passage 72 when the internal pressure of the passage 72 is equal to or lower than that of the storage chamber 4. If the pressure in the passage 72 becomes greater than the internal pressure of the storage chamber 4, the valve 75 closes the storage chamber 4 since the valve disk 76 is forced to the sealing surface 77 of the valve seat 78 by the pressure difference between them, and the storage chamber 4 is prevented from increase in pressure.

The pressure reducing device 20 per se has the same construction as that of FIG. 1 except for that the outlet valve 34 includes a spherical valve member 80 and, that the bottom plate 24 is provided at its peripheral portion with a through hole 81. The barrel 21 is screwed in the mounting seat 70 of the base member 2 in parallel relationship with the housing 3, and a packing 73 is arranged between the barrel 21 and the seat 70 to form a hermetic seal between them.

As best shown in FIG. 6, the base member 2 is provided with a groove 82, which extends radially from the bore 71 and is communicated with the through hole 81 of the bottom plate 24 to complete a means for communicating the barrel chamber 37 with the storage chamber.

The thus constructed vacuum storage device 1 is operated in the same manner as above and provides the same results.

What is claimed is:

1. A vacuum storage device comprising a base member, a housing sealingly and removably mounted on said base member to form a storage chamber, a pressure reducing device mounted on either of said base member and housing, and a means for introducing air into said storage chamber, said pressure reducing device comprising a barrel and a bellows pump housed therein, said bellows pump comprising a bellows body with an inlet valve, which opens the bellows body to said storage chamber during the suction stroke, and an outlet valve, which opens the bellows body to the open air during the discharging stroke, said pressure reducing device including a means for communicating its barrel chamber with the storage chamber.

2. A vacuum storage device according to claim 1 wherein said pressure reducing device is mounted on the housing and wherein the interior of the barrel is communicated with the storage chamber through gap formed between the bellows pump and barrel.

3. A vacuum storage device according to claim 1 wherein said pressure reducing device is mounted on the base member and is communicated with the storage chamber through a passage provided in the base member.

* * * * *